(12) United States Patent
Olesen (10) Patent No.: US 9,700,834 B2
(45) Date of Patent: Jul. 11, 2017

(54) METHOD AND ARRANGEMENT FOR DEHUMIDIFYING INTERIOR AIR IN OFF-SHORE INSTALLATIONS

(71) Applicant: Cotes A/S, Slagelse (DK)

(72) Inventor: Thomas Rønnow Olesen, Hadsten (DK)

(73) Assignee: Cotes A/S, Slagelse (DK)

( * ) Notice: Subject to any disclaimer, the term of this patent is extended or adjusted under 35 U.S.C. 154(b) by 0 days.

(21) Appl. No.: 14/777,644

(22) PCT Filed: Mar. 17, 2014

(86) PCT No.: PCT/EP2014/055303
§ 371 (c)(1),
(2) Date: Sep. 16, 2015

(87) PCT Pub. No.: WO2014/147023
PCT Pub. Date: Sep. 25, 2014

(65) Prior Publication Data
US 2016/0296885 A1    Oct. 13, 2016

(30) Foreign Application Priority Data

Mar. 18, 2013   (DK) ................................. 2013 00157
Aug. 26, 2013   (CN) .......................... 2013 1 0376610

(51) Int. Cl.
*B01D 53/02*       (2006.01)
*B01D 53/26*       (2006.01)
(Continued)

(52) U.S. Cl.
CPC ....... *B01D 53/261* (2013.01); *B01D 46/0036* (2013.01); *B01D 53/06* (2013.01);
(Continued)

(58) Field of Classification Search
CPC ............ B01D 2257/80; B01D 2279/35; B01D 46/0036; B01D 53/06; B01D 53/261;
(Continued)

(56) References Cited

U.S. PATENT DOCUMENTS

2013/0056989 A1* 3/2013 Sabhapathy ............ F03D 11/00
290/55

FOREIGN PATENT DOCUMENTS

CN    102 213 188 A    10/2011
EP    1 736 665 A2    12/2006
(Continued)

OTHER PUBLICATIONS

International Search Report completed May 22, 2014 for International Application No. PCT/EP2014/055303.

*Primary Examiner* — Christopher P Jones
(74) *Attorney, Agent, or Firm* — Brinks Gilson & Lione (57) ABSTRACT

The present invention concerns a method and an arrangement for dehumidifying and desalting interior air in off-shore installations. A simplified arrangement is presented wherein exterior intake air containing water rich in supersaturated and wet salt particles is pretreated with dry and salt free pretreatment air before entering a dehumidifying and de-salting unit from which the intake air exits as desalted and dehumidified exit air. A part of this desalted and dehumidified exit air is then redirected to the intake air flow path to serve as pretreatment air thereby simplifying construction and enhancing the lifetime of the dehumidifying and desalting unit.

15 Claims, 6 Drawing Sheets

(51) Int. Cl.
*F24F 3/14* (2006.01)
*F03D 80/00* (2016.01)
*B01D 46/00* (2006.01)
*B01D 53/06* (2006.01)
*F24F 7/06* (2006.01)
*F24F 13/28* (2006.01)
*F24F 13/30* (2006.01)

(52) U.S. Cl.
CPC ................ *F03D 80/00* (2016.05); *F24F 3/14* (2013.01); *F24F 3/1423* (2013.01); *F24F 7/06* (2013.01); *F24F 13/28* (2013.01); *F24F 13/30* (2013.01); *B01D 2257/80* (2013.01); *B01D 2279/35* (2013.01); *F05B 2240/94* (2013.01); *F05B 2260/64* (2013.01); *F24F 2003/144* (2013.01); *F24F 2003/1446* (2013.01); *Y02E 10/72* (2013.01)

(58) Field of Classification Search
CPC .. F03D 80/00; F05B 2240/94; F05B 2260/64; F24F 13/28; F24F 13/30; F24F 2003/144; F24F 2003/1446; F24F 3/14; F24F 3/1423; F24F 7/06; Y02E 10/722
See application file for complete search history.

(56) References Cited

FOREIGN PATENT DOCUMENTS

| | | |
|---|---|---|
| EP | 2 530 312 A2 | 12/2012 |
| EP | 2 568 169 A1 | 3/2013 |
| WO | WO 2011/091863 A1 | 8/2011 |

\* cited by examiner

METHOD AND ARRANGEMENT FOR DEHUMIDIFYING INTERIOR AIR IN OFF-SHORE INSTALLATIONS

This application claims the benefit under 35 U.S.C. §371 of International Application No. PCT/EP2014/055303, filed Mar. 17, 2014, which claims the benefit of Danish Application No. PA201300157, filed Mar. 18, 2013, and Chinese Application No. 201310376610.7, filed Aug. 26, 2013, which are incorporated by reference herein in their entirety.

FIELD

The present invention relates to a method and a system for dehumidifying interior air in offshore installations.

BACKGROUND

Off-shore installations, in particular off-shore wind turbines are especially exposed to corrosion due to salt and moisture. Particularly salt is a problem due to its hygroscopic nature and natural ability to transport electrons in corrosion-reactions.

Whilst the outside of the off-shore installation must be designed to bear the brunt of the elements, many of the installations within have trouble coping with the harsh environment in which the off-shore installation must survive. In particularly, the corrosive effects of salt and water combined must be effectively handled in modern off-shore installations to secure uptime and production economy.

Salt and moisture will penetrate into the inside of the off-shore installation in particular through leaks in the outer sheath of the installation, whether such leaks exist by intention of construction or by flaws. Airborne salt from droplets or spray from whitecaps and breaking waves in particular can cause much havoc on sensitive equipment within the off-shore installation.

In an off-shore wind turbine air born salt is known to enter into the inside of both tower and nacelle by leaks, or sometimes "on purpose" when outside air is used to cool inside parts. After some time, the interior structures will be coved by a salt layer that will attract water, and speed up corrosion.

The speed of corrosion is mainly dominated by three factors, 1) relative humidity, 2) salinity, and 3) temperature. Of these relative humidity is by far the most contributing factor.

Numerous studies have tried to describe the correlation between humidity and rate of corrosion in off-shore environments. In general these studies show that the speed of corrosion decreases as the relative humidity is lowered. At a relative humidity of 40-45% there is no corrosion, even though salt is present.

Also ISO9223:2011 points out the relation and based on this classifies corrosion in six classes, going from harmless C1, and up to a very harsh marine environment in C5X.

The classification is important to the cost of manufacturing a wind turbine. The higher classification, the more requirements are put to materials, surface treatments etc. Therefore being able to reduce the classification, in particularly the classification of the interior of the wind turbine, will have significant influence to the price of the wind turbine.

An economical way to protect the wind turbine against corrosion is by lowering the relative humidity by a dehumidifier, e.g. a desiccant dehumidifier. Such systems are well known and have been described in several patent applications such as e.g. WO 2011/091863 or EP 1736665.

Adsorption dehumidifiers, e.g. desiccant dehumidifiers, remove water from a volume of air that passes through it. The heart of this process could be an adsorption rotor made from or coated with a special substance that absorbs the water molecules that make up the moisture in the passing air. As the rotor absorbs water it becomes necessary to remove the absorbed water in order to regain the adsorption capability of the rotor. In order to remove the humidity in the rotor, the rotor is rotated over to a regeneration zone, where it is dried with heated air. The warm, humid regeneration air is led out, and the rotor is once again ready to absorb water molecules. This operation can be continuous or stepwise.

Figure 1:
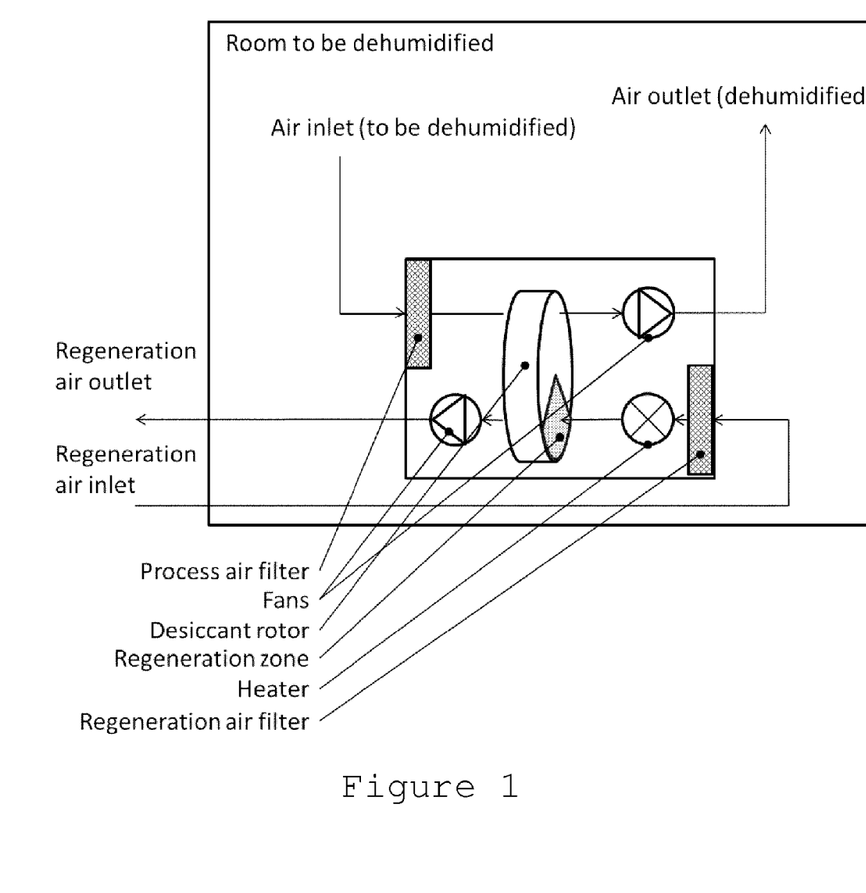
FIG. 1: Schematic drawing of a standard dehumidification system for installation in an off-shore wind turbine generating a pressure neutral internal airflow.

FIG. 1 describes a dehumidification system commonly installed in off-shore wind turbines. In the depicted setup, there are two separate air flows, process air (air to be dried) and regeneration air (air for removing moisture from rotor). This is normally a desired setup; as such a setup is pressure neutral to the room and would also be desired for off-shore wind turbine applications, only it introduces a problem as the system requires regeneration air to be taken from outside. The outside air is salty with droplets, aerosols, sprays etc. containing salt. Normally, it is very difficult to adequately arrest salt in a normal filter, as the filter will get wet, and the saline water will pass. This reduces the efficiency of the filter with a high risk of salt particles passing it. Further, if the saltwater is arrested, the salt will become sticky, and filter is in risk of becoming blocked.

Figure 2:
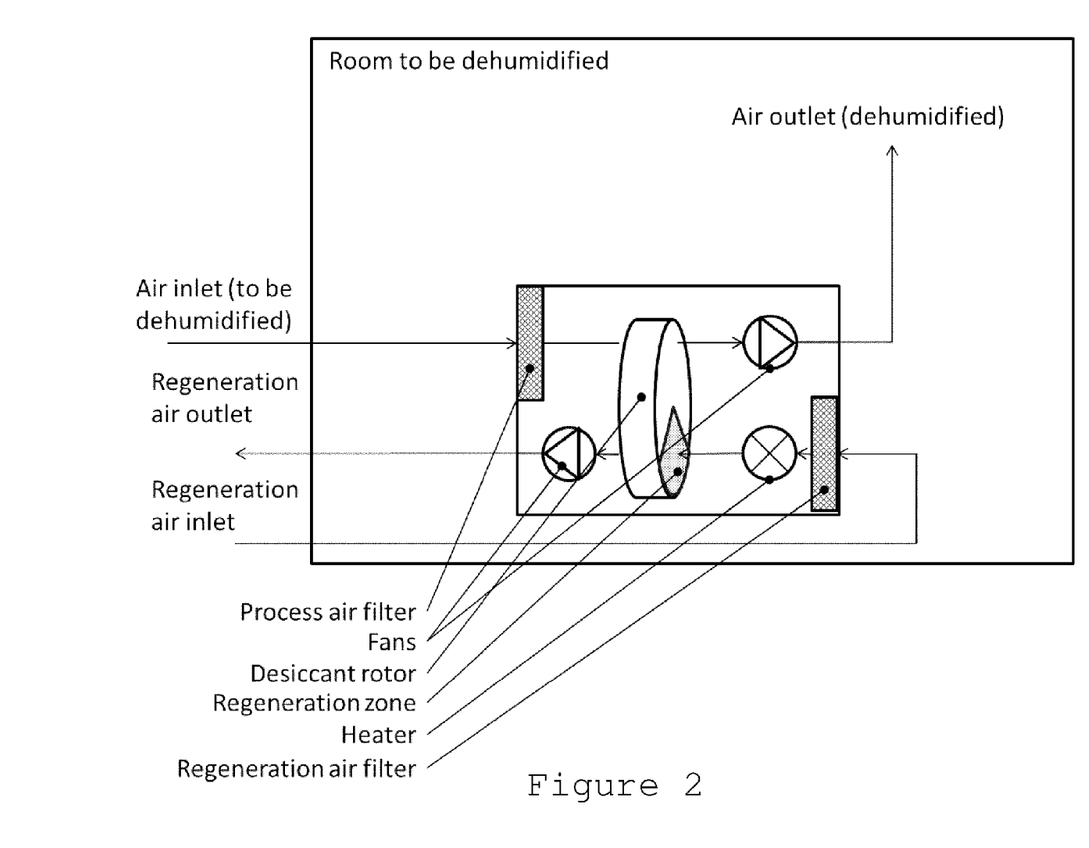
FIG. 2: Schematic drawing of a standard dehumidification system for installation in an off-shore wind turbine generating an over-pressured internal airflow.

FIG. 2 describes a dehumidification system commonly installed in off-shore wind turbines and directed to producing an over-pressure within the turbine tower. This has amongst others the benefits of reducing the inflow of moist and corrosive air through leaks etc. in the tower and turbine nacelle; to cool down inner parts (gears, generators, switches, etc.).

In FIG. 2, outside air is dehumidified and blown into the wind turbine. This will create an over-pressure. In the drawing regeneration air is taken from outside, but could also be taken from inside and like the normal pressure setup, also the displayed over-pressure setup will have problems with inefficient filters and filters clogging, due to salt.

EP 1736665 discloses a method of drying an inner space—sealed off or at least substantially sealed off from air exchange—of a wind energy plant with a dehumidifying device connected to the inner space by way of a moist air inlet and a dry air inlet and arranged between them, in that by drawing air out of the inner space through the moist air inlet a region of under-pressure is produced in the inner space, and by expelling dried air through the dry air outlet into the inner space a region of over-pressure is produced in the inner space, and between the under-pressure region and the over-pressure region a drying airflow is produced in the inner space, and the moist air inlet and the dry air outlet are kept at least a distance from each other by an air duct.

WO 2011/091863 discloses a system for the treatment of indoor air, in particular for the treatment of indoor air in the interior space of a tower of a wind energy plant, having an adsorptions system wherein from at least one dehumidification sector of an adsorption rotor is delivered dry or dried feed air to said interior space, and at least one regeneration sector of said adsorption rotor by way of an air-inlet from the exterior of said space is supplied with humid and salty exterior air as regeneration air, and wherein the moisture absorbed in the dehumidification sector of said adsorption rotor is released via an air-outlet to the exterior of said space characterized in that a heat exchanger for the regeneration air with air conduits sealed hermetically from one another, a first air conduit connected at the entry side with said air-inlet and at the exit side with said regeneration sector of said adsorption rotor, and a second air conduit connected at the entry side with said exit of said dehumidification sector and/or said exit of said regeneration sector of said adsorption rotor and with the exit side of said air-outlet and/or with said space.

WO 2011/091863 additionally foresees the use of a salt filter located downstream from the heat exchanger in direction of the airflow before the airflow reaches the adsorption rotor.

However, the problem with outside salt, i.e. salt that is entering the dehumidifying system from the exterior of the wind turbine; is that it is in a moist state and thus is hard to arrest. This leads to a risk of salt passing the filter, a reduced lifetime of the salt filters installed, and to unwanted repairs and downtime of such dehumidification systems as described in the known art.

It is thus an object of the present invention to improve upon the known art by making available a system for and a method of dehumidifying the interior of an off-shore installation, in particular an off-shore wind turbine, wherein the efficiency and the lifetime of salt filters installed as part of such a dehumidification system are significantly improved and thereby costs for maintenance and downtime for repairs for such an off-shore installation reduced.

DETAILED DESCRIPTION

A problem of known art salt filters when these are installed as part of systems for dehumidifying air in off-shore installations is the short lifetimes associated with such filters and their reduced efficiency which are due to salt clogging of the filters.

The present invention overcomes this problem by a constructionally simple modification of known dehumidification systems, whereby the efficiency and lifetime of salt filters are increased and the overall risk of spread of salt within the off-shore installation, maintenance time and repair costs for off-shore installations with installed dehumidifiers having a salt filter can be lowered.

The fundamental problem with handling of outside salt in marine environments is related to the physico-chemical properties of salt as a function of the relative humidity. Depending on relative humidity, the state of the salt can be dry, supersaturated, or wet. Often all phases will exist in the air in the marine environment at the same time, with supersaturated and wet salt particles very often dominating the picture.

Dry salt particles or salt particles having a dry surface can normally be handled in standard filters fitted to the size of the salt particles to be handled (typically filter class F8 and above).

Supersaturated and especially wet particles are more delicate to filter. As the particles are wet, the salt will make a wet film on the filter increasing the risk of salt spray passing the filter unhindered thereby reducing the filter efficiency. Further, they have an increased tendency to clog the filter. This increases the demands on the design of such salt filters as well as inducing the risk of poor filtration and a high rate of parts replacement.

The present invention suggests using some of the dehumidified air generated in the dehumidifier unit and recirculating this dehumidified air into the air feed for the dehumidifier before the air feed reaches the salt filter. By pretreating the air feed with dryer air, the relative humidity of the incoming air will already be lowered when it reaches the salt filter and the likelihood of the salt particles being in a supersaturated or wet physico-chemical state is thereby reduced, prevalently resulting in easy to filter salt particles and increased lifetimes of the salt filters.

The skilled person will notice that other means for lowering the humidity can be applied to the air feed to the salt filters in order to reduce the relative humidity before the air feed reaches said filter, e.g. by heating the air feed. The present inventors however, have found that by producing a recirculation flow a particularly easy to handle, low maintenance, and energy efficient system for off-shore purposes is generated.

What is disclosed is an arrangement (1) for dehumidifying the interior of an off-shore installation (2a,2b), in particular a wind energy plant, said interior being sealed off or at least substantially sealed off from air exchange with the exterior of said off-shore installation (2a,2b); said dehumidifying arrangement (1) comprising an air-inlet (4) for allowing intake of air from the exterior of said off-shore installation (2a,2b), a salt filter (11), a dehumidifier unit (12), an intake air flow path leading said intake air from said air-inlet (4) to said dehumidifier (12) via said salt filter (11); a flow path for desalted and dehumidified air (9) leading from said dehumidifier (12) to the interior of said off-shore installation (2a,2b); a regeneration flow path (8b) leading air from said interior to an air outlet (5) via said dehumidifier (12) characterized in that said dehumidifying arrangement (1) further comprises an air mixing unit (10) positioned in said intake air flow path upstream to said salt filter (11); and a return flow path (6) arranged to direct a portion of a flow of said desalted and dehumidified air from said dehumidifier (12) to said mixing unit (10); and/or a first recirculation flow path leading air from said interior to said mixing unit (10).

Figure 3:
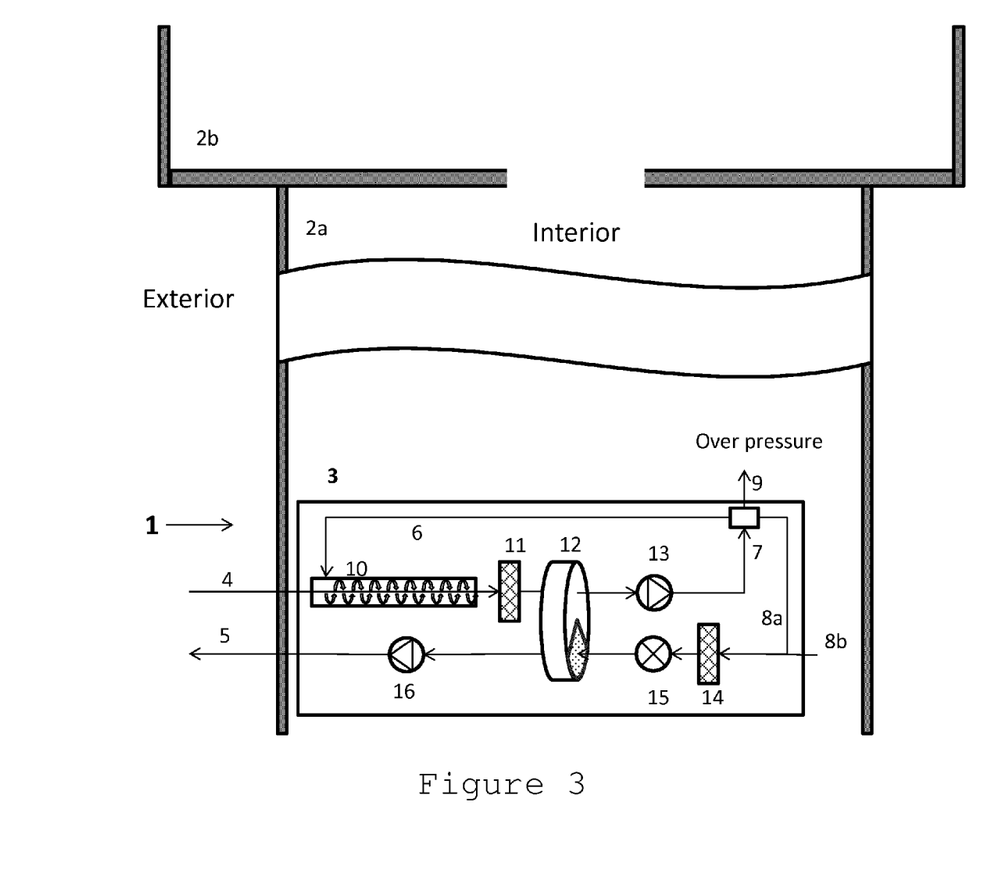
FIG. 3: Schematic drawing of an exemplary embodiment of the dehumidification system according to the present invention.

In FIG. 3 is shown an exemplary embodiment of the present invention according to the preceding paragraph wherein the dehumidifier is disclosed in the form of a desiccant rotary adsorption unit and wherein additionally to the components disclosed above an air filter (14) and a heater (15) is shown as part of the regeneration flow path (8b) together with fans (13,16) for moving the air through the arrangement. In this exemplary embodiment, the air exits the dehumidifier (12) following a single flow path (7) and is split between the flow paths 6, 8a, and 9 downstream from the dehumidifier (12) and a fan 13. This arrangement is preferred but the invention is not limited by this. E.g. for some applications it will be advantageous to split the flow paths early before introducing fans to move the air.

Also disclosed and shown in FIG. 3 is an arrangement as described above further comprising a second recirculation flow path (8a) arranged to direct a portion of a flow of said desalted and dehumidified air from said dehumidifier (12) to said regeneration flow path (8b).

The air exiting the dehumidifier (12) will be warmer than the entry air as the dehumidification and desalting process releases some quantities of store energy from the system. If the air is destined to be used for cooling within the off-shore installation it is contemplated that the arrangement as described above can be extended through the use of a heat exchanger, e.g. a plate heat exchanger or simply cooled using a chiller. Due to the removal of the salt from the interior air an industrial quality chiller which is not necessarily specified for off-shore use may nonetheless be used in the arrangement.

The use of a plate heat exchanger will require cooling with external air, which however, does not have to be salt free; on the contrary it can be advantageous to design the heat exchanger for regular whole unit exchange at system maintenance.

Figure 4:
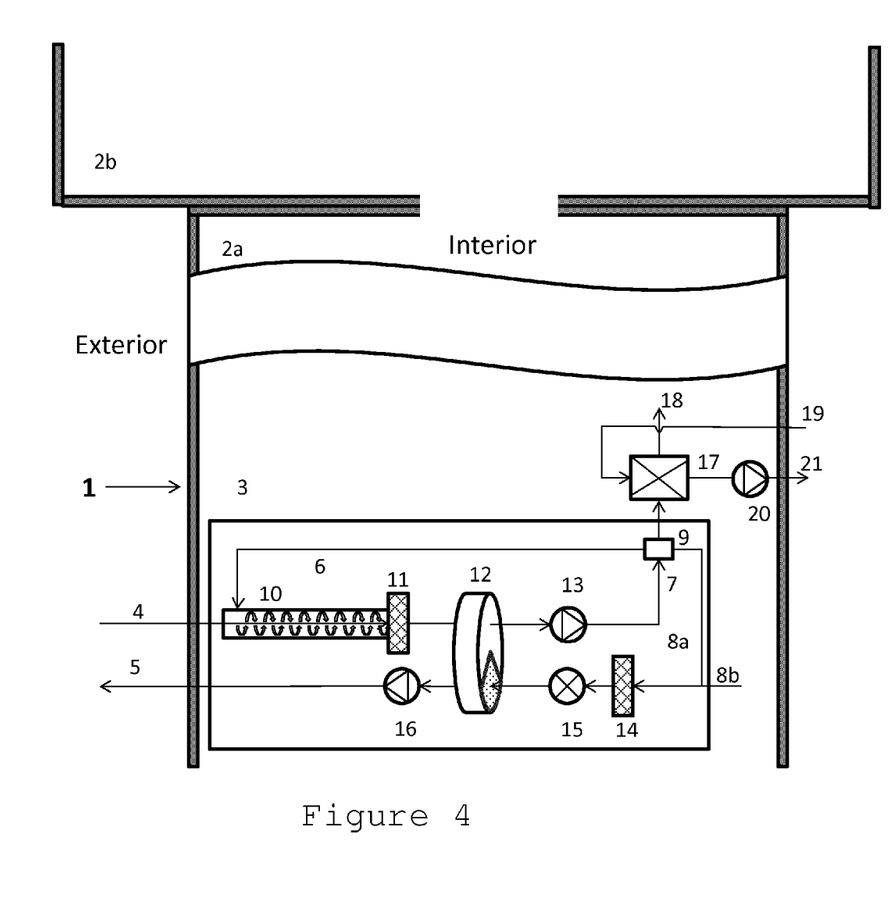
FIG. 4: Schematic drawing of an exemplary embodiment of the dehumidification system according to the present invention wherein the dehumidification system is further connected to a heat exchanger unit.

Herein disclosed and shown in FIG. 4 is an arrangement as described above which further comprises a heat exchanger (17) arranged downstream from said dehumidifier (12) in said flow path for desalted and dehumidified air (9).

In the exemplary embodiment of the invention shown in FIG. 4, the air entering the heat exchanger (17) via the flow path (9) exits the heat exchanger via the flow path (18) while a coolant air flow (19) is transported through the heat exchanger by means of a fan (20).

Figure 5:
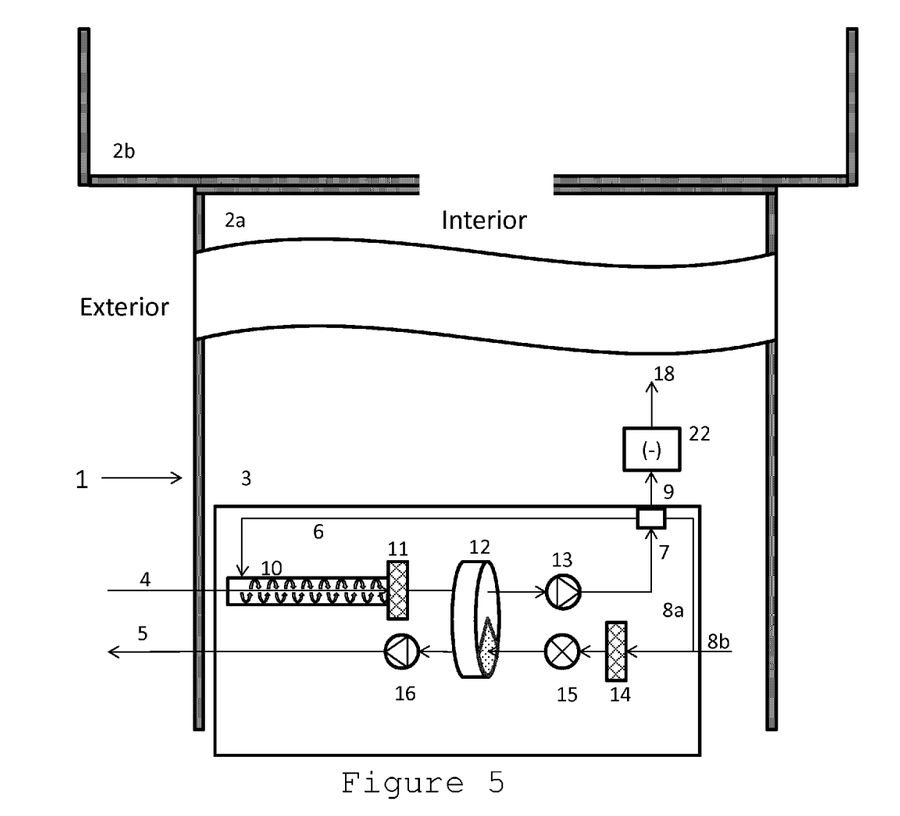
FIG. 5: Schematic drawing of an exemplary embodiment of the dehumidification system according to the present invention wherein the dehumidification system is further connected to a chiller unit.

Also disclosed and shown in FIG. 5 is an arrangement as described above further comprising a chiller (22) arranged downstream from said dehumidifier (12) in said flow path for desalted and dehumidified air (9).

Finally a dehumidification unit comprising an arrangement as described above and an off-shore installation comprising at least one dehumidification unit is disclosed.

In further embodiments, the dehumidifier unit (12) is a desiccant rotary adsorption unit, a condensator unit or a heating unit.

Further, the mixing unit (10) can be a mixing duct, a mixing chamber or a mixing unit having active means for mixing air flows such as e.g. a fan. Also the mixing unit can be constructed with means for passive mixing e.g. by means of passive augers.

An arrangement, a dehumidification unit and an off-shore installation as described above offer several advantages including that the filtered and dehumidified air offers means for corrosion protection, means for cooling or heating an off-shore installation or means for supplying fresh air and clean air to further installations and units within the off-shore installation in need thereof.

Figure 6:
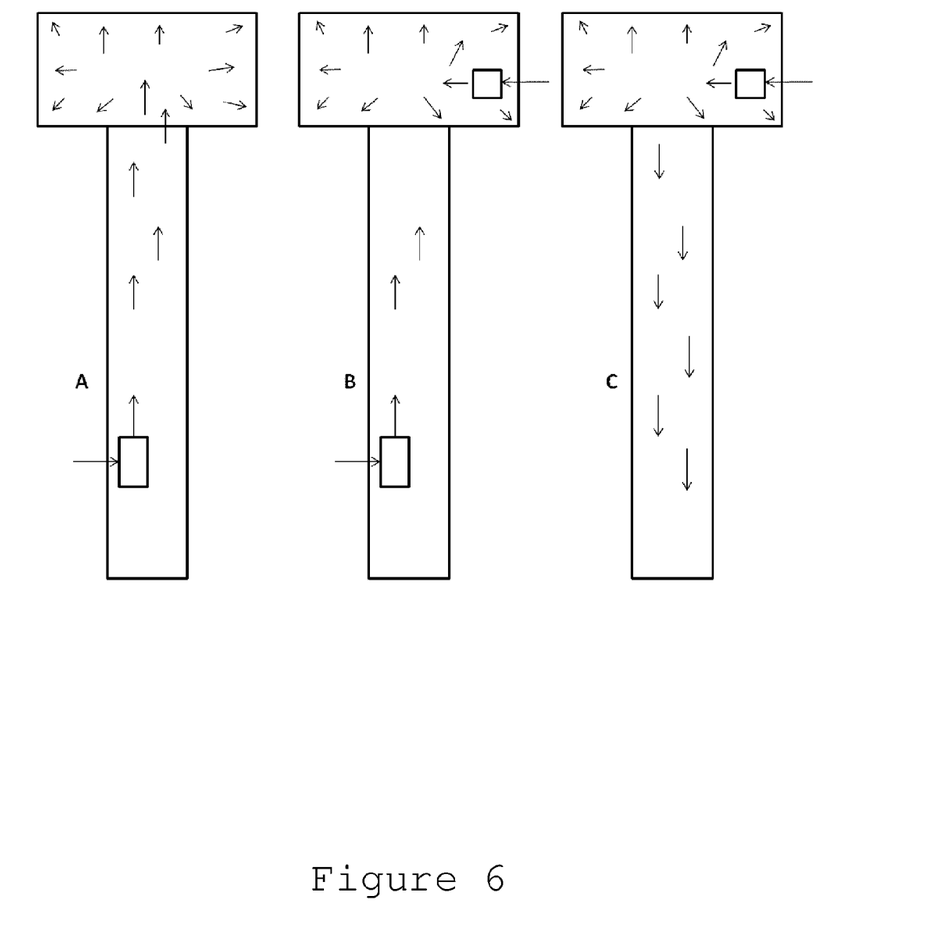
FIG. 6: Schematic drawing of various positions within the wind turbine tower (A), Nacelle (C) or both (B) where it is contemplated that a system according to the present invention can be installed.

FIG. 6 shows exemplary embodiments of the possible locations for installing an arrangement or a unit according to the present invention. The further away from the sea level the arrangement or unit is installed; the lower the salt content of the intake air. This can be beneficial for some applications while for other applications it is preferred to install the arrangement or the unit close to the sea level within the off-shore installation. For some applications it may even be beneficial to install the arrangement outside the off-shore installation, e.g. in an adjacent shed, in order to improve accessibility to the arrangement for maintenance.

The term "comprising" as used in the claims does not exclude other elements or steps. The term "a" or "an" as used in the claims does not exclude a plurality. The reference signs used in the claims shall not be construed as limiting the scope.

Although the present invention has been described in detail for purpose of illustration, it is understood that such detail is solely for that purpose, and variations can be made therein by those skilled in the art without departing from the scope of the invention.

The invention claimed is:

1. An arrangement for dehumidifying an interior of an off-shore installation, in particular a wind energy plant, said interior sealed off or at least substantially sealed off from air exchange with an exterior of said off-shore installation; said dehumidifying arrangement comprising:
   an air-inlet for allowing intake of air from the exterior of said off-shore installation,
   a salt filter,
   a dehumidifier unit,
   an intake air flow path leading said intake air from said air-inlet to said dehumidifier via said salt filter;
   a flow path for desalted and dehumidified air leading from said dehumidifier to the interior of said off-shore installation;
   a regeneration flow path leading air from said interior to a regeneration air outlet via said dehumidifier
   wherein said dehumidifying arrangement further comprises
   an air mixing unit positioned in said intake air flow path upstream to said salt filter; and
   a return flow path arranged to direct a portion of a flow of said desalted and dehumidified air from said dehumidifier to said air mixing unit.

2. The arrangement according to claim 1, further comprising a recirculation flow path arranged to direct a portion of a flow of said desalted and dehumidified air from said dehumidifier to said regeneration flow path.

3. The arrangement according to claim 1, further comprising a heat exchanger arranged downstream from said dehumidifier in said flow path for desalted and dehumidified air after said return flow path.

4. The arrangement according to claim 1, further comprising a chiller arranged downstream from said dehumidifier in said flow path for desalted and dehumidified air after said return flow path.

5. A dehumidification unit comprising an arrangement according to claim 1.

6. An off-shore installation comprising at least one dehumidification unit according to claim 5.

7. The arrangement according to claim 1, wherein the dehumidifier unit is a desiccant rotary adsorption unit, a condenser unit or a heating unit.

8. The arrangement according to claim 1, wherein the mixing unit is a mixing duct; a mixing chamber having a passive air mixer or a mixing chamber having an active air mixer.

9. The arrangement according to claim 8, wherein the passive air mixer comprises passive augers.

10. The arrangement according to claim 8, wherein the active air mixer comprises a fan.

11. The dehumidification unit according to claim 5, further comprising a recirculation flow path arranged to direct a portion of a flow of said desalted and dehumidified air from said dehumidifier to said regeneration flow path.

12. The dehumidification unit according to claim 5, further comprising a heat exchanger arranged downstream from said dehumidifier in said flow path for desalted and dehumidified air after said return flow path.

13. The dehumidification unit according to claim 5, further comprising a chiller arranged downstream from said dehumidifier in said flow path for desalted and dehumidified air after said return flow path.

14. The arrangement according to claim 1, further comprising a recirculation flow path leading air from said interior to said air mixing unit.

15. The arrangement according to claim 1, further comprising a recirculation flow path leading air from said interior to said air mixing unit and a recirculation flow path arranged to direct a portion of a flow of said desalted and dehumidified air from said dehumidifier to said regeneration flow path.

\* \* \* \* \*